United States Patent [19]

Preston et al.

[11] Patent Number: 4,940,109

[45] Date of Patent: Jul. 10, 1990

[54] SPLIT ARM THROTTLE CABLE INTERVENTION DEVICE

[75] Inventors: David M. Preston, Madison Heights; Donald R. Haefner, Oak Park, both of Mich.

[73] Assignee: Eaton Corporation, Cleveland, Ohio

[21] Appl. No.: 381,551

[22] Filed: Jul. 18, 1989

[51] Int. Cl.⁵ .............................................. B60K 13/02
[52] U.S. Cl. .................................... 180/197; 180/335; 123/342
[58] Field of Search ................... 180/197, 335, 178; 123/340, 342, 361, 399

[56] References Cited

U.S. PATENT DOCUMENTS

| | | | |
|---|---|---|---|
| 1,582,239 | 4/1926 | Barbarou | 123/401 |
| 4,346,776 | 8/1982 | Taplin | 180/179 |
| 4,367,805 | 1/1983 | Totani et al. | 180/179 |
| 4,397,276 | 8/1983 | Hayashida | 123/347 |
| 4,473,049 | 9/1984 | Jahr | 123/396 |
| 4,474,083 | 10/1984 | Braun | 74/867 |
| 4,523,667 | 6/1985 | Smyth | 192/0.092 |
| 4,531,430 | 7/1985 | Holmes | 74/858 |
| 4,543,932 | 10/1985 | Sturdy | 123/342 |
| 4,559,912 | 12/1985 | Larom et al. | 123/350 |
| 4,703,823 | 11/1987 | Yogo et al. | 180/197 |
| 4,714,864 | 12/1987 | Yogo et al. | 318/52 |
| 4,721,176 | 1/1988 | Kabasin et al. | 180/197 |
| 4,722,411 | 2/1988 | Ohashi et al. | 180/197 |
| 4,747,380 | 5/1988 | Eijiri et al. | 123/399 |
| 4,750,582 | 6/1988 | Maas | 180/197 |
| 4,768,483 | 9/1988 | Asayama | 123/399 |
| 4,785,691 | 11/1988 | Papenhagen et al. | 74/877 |
| 4,785,781 | 11/1988 | Pfalzgraf et al. | 123/396 |
| 4,785,782 | 11/1988 | Tanake et al. | 123/399 |
| 4,795,000 | 1/1989 | Ocuirk et al. | 180/197 |
| 4,838,225 | 6/1989 | Steffes | 123/342 |

Primary Examiner—Charles A. Marmor
Assistant Examiner—Mitchell S. Bompey
Attorney, Agent, or Firm—J. G. Lewis

[57] ABSTRACT

A vehicle engine throttle valve control device (10) is applied intermediate the vehicle operator's accelerator pedal (14) and the engine's throttle body (12) to selectively override or modify the operator's ability to control vehicle/engine speed and to assert independent control thereof as a function of various input parameters (49,50,52,54). Linkages (26,28) interconnect opposed ends of an assembly of half levers (21,23) with accelerator and throttle. The half levers rotate upon a pivot (20) which is selectively displacable to effectively shorten or lengthen the linkage in response to an operator independent signal from a control circuit (42). A half lever stop (27) fixes the relative positions of the half levers whenever the throttle body is in an off-idle position.

22 Claims, 2 Drawing Sheets

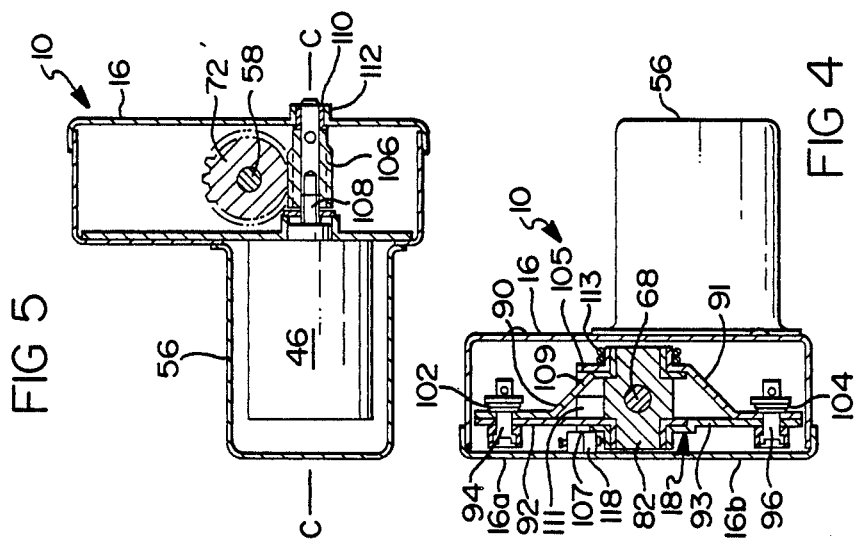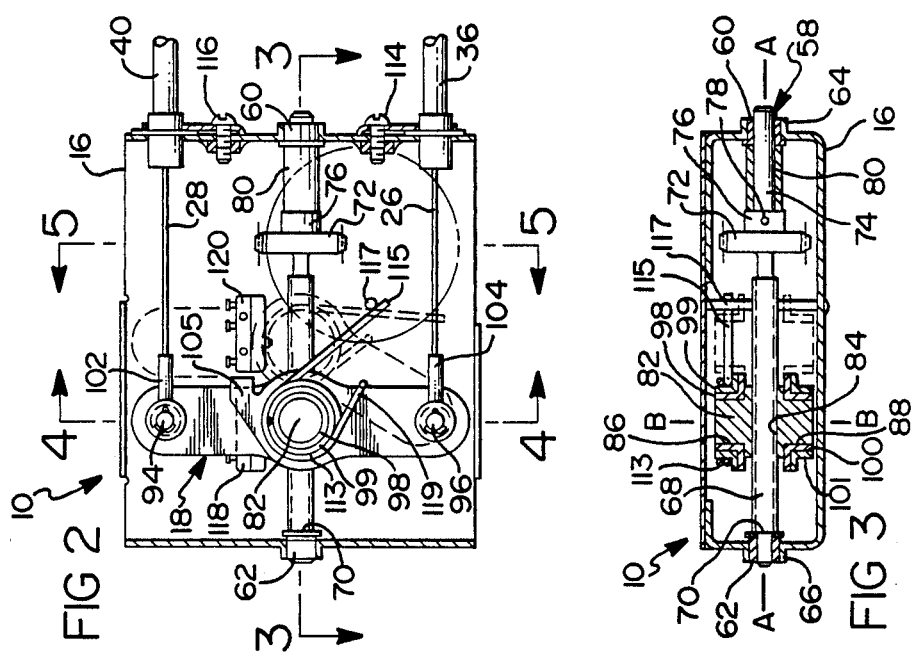

SPLIT ARM THROTTLE CABLE INTERVENTION DEVICE

Introduction

The present invention relates to throttle valve control device for internal combustion engines, and more particularly to vehicle throttle intervention devices which inhibit, limit or modify operator control.

Cross Reference

The subject matter of this application is related to that of an application filed on even date herewith entitled "Throttle Cable Intervention Device" naming inventors Donald Haefner and David Preston and identified as U.S. Ser. No. 381,550.

Background of the Invention

Ground vehicles such as automobiles and trucks propelled by internal combustion engines are typically controlled by an operator accelerator pedal which is directly mechanically linked to an engine speed controlling device such as a throttle body or fuel injection pump. Recently, so called fly-by-wire systems have been considered for automotive applications which replace the accelerator pedal to throttle body mechanical linkage with an electrical control system in which the operator input is an electrical signal to a controller which is processed, amplified and output to an actuator or motor for positioning the vehicle throttle. Fly-by-wire systems provide the advantage of accepting operator speed demand as only one of a number of input parameters which determine the ultimate positioning of the throttle and thus permit overriding or modifying a driver input if safety or performance considerations so require. Typical systems requiring throttle intervention include traction control, cruise control and engine speed governing.

Although fly-by-wire techniques have found acceptance in aerospace and certain industrial applications, its penetration in the automotive industry has been limited due to countervailing considerations of reliability and economy.

A compromise approach to vehicle throttle control thus employs conventional mechanical linkage between the accelerator pedal and the throttle body in combination with electromechanical devices which alter the linkage geometry to permit the implementation of traction control and other features while retaining proven throttle control techniques. Although such systems are gaining acceptance, they tend to be slow to respond to rapid changes in input parameters and, in traction control applications, can require the application of vehicle brakes during periods of operator acceleration demand. Furthermore, such systems typically employ multiple return springs, slip joints and the like which can create an objectionable change in the accelerator pedal position force characteristic while in the intervention mode.

It will be apparent from a reading of the specification that the present invention may be advantageously utilized with throttle controls for internal combustion engines intended for many different applications. However, the invention is especially useful when applied to the accelerator pedal-throttle body linkage of an automotive vehicle, and will be described in connection therewith.

Brief Description of the Invention

The present invention finds particular application in an automobile powered by an internal combustion engine in which the vehicle operator establishes a vehicle speed by depressing an accelerator pedal mechanically linked to the engine throttle body. A mechanism is interposed between the throttle body and accelerator pedal which operates to control engine speed independently of operator demand by varying the geometry or effective length of the linkage. The mechanism includes a first member mounted for slaved movement with the accelerator pedal between first and second pedal travel positions. A second member is mounted for slaved movement with the throttle body between first and second throttle positions. A motion transfer mechanism or lever assembly includes first and second lever portions mounted for limited relative rotation upon a pivot serving to interlink the first and second members which are affixed thereto at respective attachment points spaced from one another as well as the pivot. Means are provided to fix the relative positions of the lever portions whenever the throttle is not in the first position and permit relative rotation of the lever portions when the throttle is in the first position. Finally, an actuator operates to selectively displace the pivot between end limits of travel to effect intervening control of the engine. This arrangement provides extremely responsive throttle control independent of operator demand for the implementation of traction control, cruise control and the like.

In the preferred embodiment of the present invention, the actuator means comprises a motor driven threaded shaft which carries a shuttle defining the lever pivot. The intervention device further includes a controller which operates to receive parametric inputs such as vehicle and drive wheel speed information, shuttle end of travel, and throttle body/accelerator position feedback and generate a control signal as a function thereof to control the electric motor. This arrangement has the advantage of providing a throttle intervention device which is extremely simple and cost effective.

According to one aspect of the invention first and second throttle positions correlate with idle and full throttle. A first spring tends to continuously bias the throttle body towards the idle position at a fixed spring rate. A second spring tends to continuously bias the accelerator pedal toward the zero pedal travel position with a force which varies as a function of the pivot's position. This arrangement provides the advantage of compensating for loss of throttle spring return force caused by transition of the intervention mode wherein the pedal position force characteristic perceived by the operator remains substantially unchanged.

Various other features and advantages of this invention will become apparent upon reading the following specification, which, along with the patent drawings, describes and discloses a preferred illustrative embodiment of the invention in detail.

The invention makes reference to the accompanying drawings.

Brief Description of the Drawings

FIG. 2, is an elevational view of the preferred embodiment of the throttle cable intervention device of FIG. 1 on an enlarged scale and in greater detail with a portion thereof cut away;

FIG. 3, is a sectioned view looking along line 3—3 of FIG. 2;

FIG. 4, is a sectioned view looking along line 4—4 of FIG. 2;

FIG. 5, is a sectioned view looking along line 5—5 of FIG. 2; and

Detailed Description of the Drawings

Figure 1:
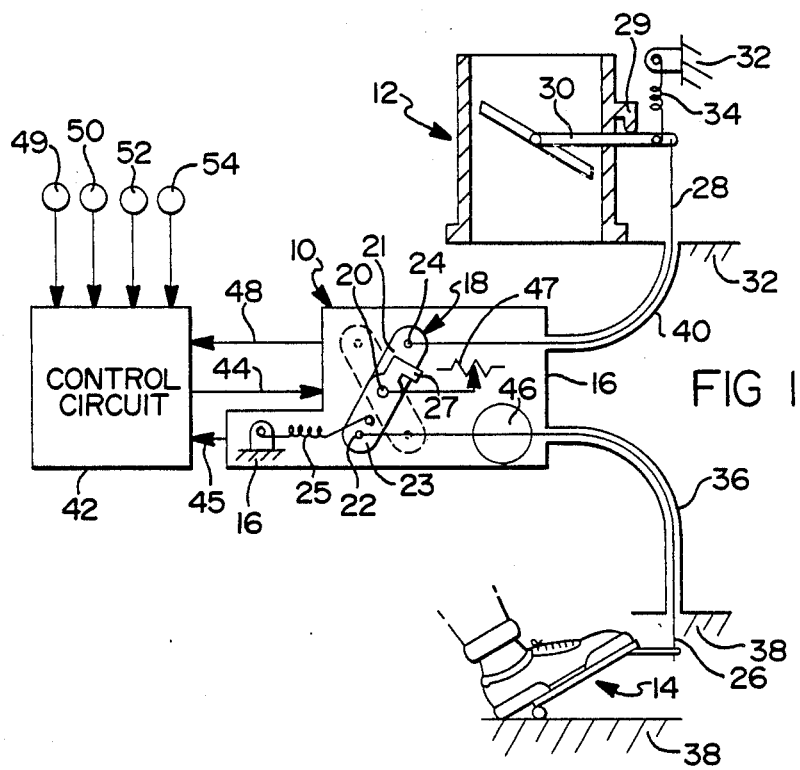
FIG. 1, schematically illustrates the throttle cable intervention device of the present invention connected between an accelerator pedal and a throttle body in the idle throttle position.

Referring to FIG. 1, a device is illustrated which allows electronic intervention of a mechanical throttle control system. The intervention device will be described as part of a traction control system, effecting throttle closure during periods of host vehicle wheel slip.

The system of FIG. 1 includes a throttle cable intervention device or mechanism 10 mechanically interposed between a throttle body 12 and accelerator pedal 14 of an associated host vehicle. As will be described in detail herein below, intervention device 10 includes a housing assembly 16 enclosing an articulated or split arm lever assembly 18 or motion transfer device mounted for limited rotation upon a pivot 20. Lever assembly 18 includes first and second half levers 21 and 23, respectively, defining first and second attachment points 22 and 24, respectively, at opposed ends thereof straddling pivot 20. A first draw cable 26 interconnects attachment point 22 and accelerator pedal 14. A spring 25 interconnects the free end of half lever 23 with housing 16, tending to bias half lever 23 in a clockwise direction as well as urging accelerator 14 toward the zero (idle) position illustrated. Likewise, a second draw cable 28 interconnects attachment point 24 and throttle plate operating linkage 30 of throttle body 12. Throttle body 12 is mounted to an internal combustion engine indicated at 32. A return spring 34 interconnects linkage 30 with a grounded point of IC engine 32 to urge throttle body 12 toward the idle position. Draw cable 26 is enclosed within a sheath 36 which is affixed at one end to housing 16 and at the opposite end to the chassis 38 of the host vehicle. Likewise, draw cable 28 is enclosed within a sheath 40 connected at one end to housing 16 and at the opposite end to IC engine 32. As is well understood in the art, both draw cables 26 and 28 and sheaths 36 and 40 are radially flexible but axially rigid. Thus, although IC engine 32 will tend to move somewhat with respect to chassis 38, the dimension along the line of action of draw cables 26 and 28 interconnecting accelerator pedal 14 and throttle body 12 with lever assembly 18 will remain fixed and the respective positional relationship between accelerator pedal 14 and throttle plate of throttle body 12 will vary only upon displacement of pivot 20. This arrangement provides the advantage of extremely flexible and adaptive mounting of intervention device 10 with various vehicle chassis/engine configurations. It is understood that the pull cable arrangement illustrated in FIG. 1 is by way of example and could be substituted with a conventional system of rigid links and bell cranks.

When the vehicle operator demands additional vehicle speed by pressing down on the accelerator pedal 14, draw wire 26 will tend to rotate half lever 23 from its illustrated idle position toward the full throttle (phantom) position. As will be described in greater detail below, half lever 23 has an integral stop 27 depending therefrom which will align the lines of elongation of lever halves 21 and 23 causing them to rotate as illustrated whenever spring 34 provides tension in draw cable 28 (i.e., whenever throttle 12 is in an off-idle position). Rotation of lever assembly 18 will pull on cable 28, tending to open throttle body 12 from its rest position against an idle stop 29, increasing the speed of the host vehicle. Conversely, when the operator reduces the pressure applied to the accelerator pedal 14, spring 34 will tend to return throttle body 12 to the idle position and draw first half lever 21 back to its illustrated position. Simultaneously, second spring 25 within housing 16 will urge second half lever 23, draw wire 26 and accelerator pedal 14 back to their illustrated positions.

As will be described in detail herein below, throttle cable intervention device 10 includes an adjustment mechanism controlled by an electronic circuit 42 which generates a control signal on conductors 44 connected to a dc motor 46 within device 10. Motor 46 is mechanically interconnected to actively position pivot 20 as will be described herein below. Likewise, the presence of lever assembly 18 at either of its end limits of travel is output as a signal from intervention device 10 on conductors 48 to control circuit 42. Furthermore, a relative position signal is output on conductors 45 from a position sensor 47 such as a potentiometer mounted to pivot 20 within intervention device 10. Other parametric inputs to control circuit 42 are provided including, but not limited to, vehicle speed 49, driven wheel speed 50, throttle body feedback position 52, and accelerator pedal position feedback 54. Inasmuch as traction control circuits are widely known, the details of control circuit 42 are deleted here for the sake of brevity, it being understood that any number of suitable configurations are available.

Referring to FIGS. 2-5, the details of intervention device 10 are illustrated. Housing 16 is formed of sheet metal or other suitable material in a generally rectangular configuration with a generally cylindrical motor cover portion 56 affixed thereto. Because intervention device 10 may be subjected to a relatively harsh environment, it is contemplated that suitable sealing and mounting provisions (not illustrated) will be made.

A shaft indicated generally at 58 is mounted within housing 16 and is supported therein at its extreme ends by suitable bushings 60 and 62 supported in opposed outwardly opening bosses 64 and 66 integrally formed within housing 16. Shaft 58 has a threaded portion 68 terminating at its left end (as viewed in FIGS. 2 and 3) in a step 70 abutting a thrust surface formed by bushing 62. Threaded portion 68 of shaft 58 terminates at its right end adjacent a worm gear 72 pressed upon a smooth portion 74 of shaft 58. Worm gear 72 includes an integral hub 76 and is affixed for rotation with shaft 58 by suitable fastening means such as a radial pin 78. Smooth portion 74 extends through a tubular spacer 80 extending between the righthand most surface of hub 76 and a thrust surface defined by bushing 60. Thus, as illustrated, shaft 58 is axially restrained in both directions within housing 16 but is free to rotate therein.

A generally cylindrically shaped carrier or shuttle 82 includes a centered radially disposed threaded through passage 84. Threaded portion 68 of shaft 58 threadably engages carrier 82 within through passage 84. The ends (top and bottom as viewed in FIG. 3) of carrier 82 have steps 86 and 88 formed therein which co-act to comprise pivot 20 for crank arm or lever assembly 18. Half lever 21 consists of elongated complimentary segments 90 and 92 which are joined at the upper ends (FIG. 4) thereof by a pivot assembly 94. The lower ends of segments 90 and 92 are spaced to entrap carrier 82 wherein steps 86 and 88 extend outwardly through respective integrally formed outwardly extending bosses 98 and 100. Likewise, half lever 23 consists of elongated complimentary segments 91 and 93 which are joined at the lower ends thereof by a pivot assembly 96. The upper ends of segments 91 and 93 are spaced to entrap carrier 82 wherein steps 86 and 88 (and concentric bosses 98 and 100) extend outwardly through respective integrally formed outwardly extending bosses 99 and 101. Thus, half levers 21 and 23 are retained in assembly with carrier 82 and are displacable therewith along shaft 58 axis of rotation designated A—A. Furthermore, half levers 21 and 23 are each free for limited rotation about axis B—B of carrier 82. Finally, as best viewed in FIG. 4, although lever assembly 18 and carrier 82 are nominally free to rotate about axis A—A of shaft 58, such rotation is prevented by close spacing between pivot assemblies 94 and 96 and adjacent wall portions 16a and 16b of housing 16.

Draw cables 26 and 28 are each terminated in a member or swivel 102 and 104, respectively, interconnected with pivot assembly 94 and 96, respectively. In application, swivels 102 and 104 are displaced along the substantially parallel linear lines of action of their respective draw cables.

Relative rotation between half levers 21 and 23 is controlled or selectively fixed whenever throttle body 12 is in a non-idle position by stops 27 defined by integral extensions 105 and 107 depending upwardly from segments 91 and 93 (FIG. 4), respectively, above carrier 82. The free ends 109 and 111 of extensions 105 and 107, respectively, are turned inwardly to abut segments 90 and 92, respectively, when the lines of elongation of half levers 21 and 23 are aligned (illustrated in FIG. 2). When thus aligned, half levers 21 and 23 rotate in unison as described in the aforesaid co-pending application.

A double wound torsion spring 113 is concentrically carried on boss 99 and includes a first leg extension 115 bearing against a transverse grounding pin 117 mounted to housing 16 below axis A—A as a stationary reference, and a second leg extension 119 engaging an edge of segment 91. As best viewed in FIG. 2, spring 113 is wound about boss 99 whereby leg 115 bears upwardly against pin 117 and leg 119 bears downwardly upon segment 91 with the effect that half lever 23 is continuously urged clockwise. As carrier 82 moves rightwardly, leg 115 of spring 113 is wrapped clockwise around boss 99 to vary (increase) the effective spring force. Additionally, leg 119 of spring is (un)wrapped around boss 99 with rotation of half lever 23. The net wrap of spring 113 offsets the resultant change in force from spring 34. Spring 113 can be sized to be equal to, greater than, or less than that of throttle spring 34.

Motor 46 is mounted to housing 16 and has a worm 106 mounted to the output shaft 108 thereof for rotation about an axis designated C—C. Worm 106 is in engagement with worm gear 72 and has its free end (righthand most as viewed in FIG. 5) supported by a bushing 110 extending within an integral outwardly opening boss 112 within housing 16.

Sheaths 36 and 40 are rigidly affixed to housing 16 by suitable terminations and mounting hardware 114 and 116, respectively. Two spaced momentary contact switches 118 and 120 are mounted within housing 16 along the line of travel of bosses 98 and 99 whereby when carrier 82 and lever 18 reach a leftward limit of travel as viewed in FIG. 2, the outer circumferential surface of boss 99 cams against the contact of switch 118, causing it to change electrical state. Likewise, when lever 18 and carrier 82 advance rightwardly as viewed in FIGS. 2 and 3 (in phantom) to a position wherein boss 99 cams against the contact of switch 120, its electrical state will change. Thus, lever 18 and carrier 82 are illustrated in their limits of travel along axis A—A. Motor 46 is interconnected with control circuit 42 via conductors 44 and switches 118 and 120 are electrically connected to control circuit 42 via conductors 48. Potentiometer 47 (FIG. 1) includes a wiper linked for travel with pivot 20 and a resistor portion carried by housing 16 in a usual manner to provide a characteristic resistance for each point of travel of pivot 20 between its limits of travel. Potentiometer 47 is interconnected with control circuit 42 via conductors 45. Conductors 44, 45 and 48 and potentiometer 47 are not illustrated in drawing FIGS. 2-5 for the sake of simplicity.

In FIG. 2, lever assembly 18 is illustrated in solid line under the condition where no throttle cable intervention is taking place and the throttle is positioned approximately half way between idle and full throttle position. With motor 46 de-energized, the intermeshing of worm gear 72 and worm 106 will prevent rotation of shaft 58 and thus carrier 82 will remain in its illustrated position fixing the pivot point of lever assembly 18 about axis B—B shown in FIG. 3. As described herein above, if the accelerator pedal 14 is further advanced, draw wire 26 will tend to rotate lever 18 counterclockwise, in turn, pulling draw wire 28 to the left as illustrated in FIG. 2 further opening the throttle 12. Boss 99 remains in contact with switch 118 whereby the control circuit 42 is disabled from generating anything but a dc voltage signal which will drive motor 46 in a rotational sense to displace carrier 82 rightwardly as viewed in FIG. 2. Based upon parametric inputs from transducers 49, 50, 52, and 54, when control circuit 42 determines that wheel slip is taking place, and that lever assembly 18 is other than in its full intervention (phantom) position, control circuit 42 will output a dc voltage signal on conductors 44 to energize motor 46 and thereby rotate shaft 58. Rotation of shaft 58 will cause carrier 82 and lever assembly 18 to translate rightwardly. Assuming that the vehicle operator maintains the accelerator pedal 14 in a fixed position, lever assembly 18 will tend to rotate clockwise about attachment point 22 as carrier 82 translates rightwardly from the position illustrated in solid line in FIG. 2. Half levers 21 and 23 will remain in alignment until throttle linkage 30 contacts stop 29. Thereafter, further rightward advancement of carrier 82 will cause lever assembly 18 to break as illustrated in phantom in FIG. 2 wherein half lever 21 will pivot about pivot assembly 94 in a counter clockwise direction, out of alignment with half lever 23. At that condition, the driver will perceive only the effect of spring 113. Conversely, when control circuit 42 senses that wheel slipping no longer occurs and that lever 18 is axially positioned at other than its solid line illustrated position in FIG. 2, it will output a dc voltage signal of opposite polarity on conductors 44 to drive motor 46 in the reverse direction thereby translating carrier 82 leftwardly as viewed in FIG. 2 until either boss 98 contacts switch 118 or control circuit 42 again senses a wheel slip condition. This leftward displacement will realign half levers 21 and 23.

Figure 6:
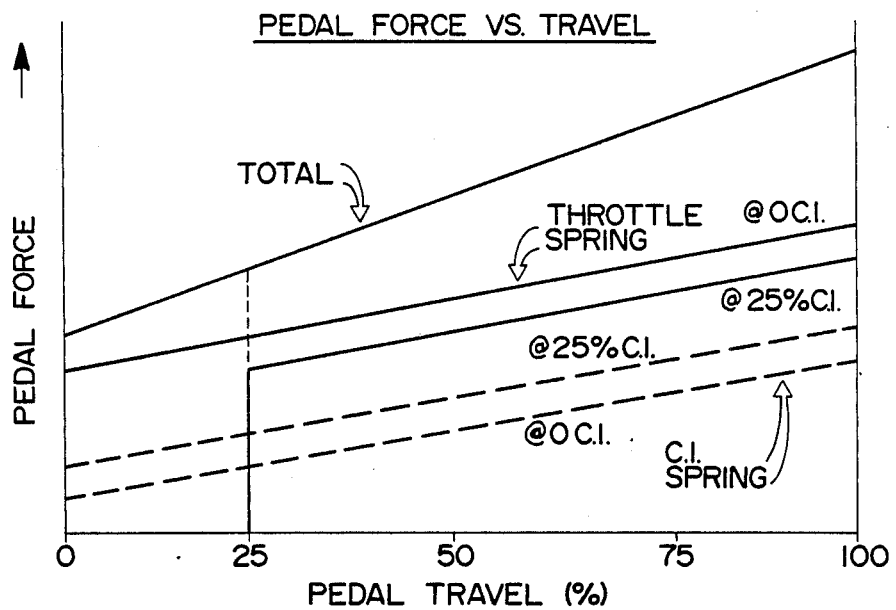
FIG. 6, is a graphical illustration of the total accelerator force versus travel characteristic of the throttle cable intervention device of FIG. 1.

Referring to FIG. 6, the characteristic pedal force encountered by the vehicle operator over the entire range of pedal travel is graphically illustrated. The total force or resistance experienced at pedal 14 represents the combined effect of throttle return spring 34 and the cable intervention (CI) spring 25,113. During the non-intervention mode, the total pedal force characteristic is the sum of the throttle spring characteristic and the CI spring characteristic throughout the range of pedal travel. During cable intervention the throttle return spring force characteristic shifts with respect to pedal travel. Using a 25% cable intervention example with the driver demand being 25% of pedal travel, it can be seen that the pedal force would tend to zero if it were not for the cable intervention spring 113. If cable intervention spring 113 existed but did not shift its biasing force with pivot 20 travel, the pedal force would be reduced from the total travel curve to the zero percent C.I. force curve. However, with the force biasing nature of the above described device, the pedal force for non-idle amounts of cable intervention can be unchanged. Therefore, cable intervention traction control can be invisible to the drivers tactile perception. As stated above, once the throttle 12 is in the closed or idle position, stop 29 effectively eliminates throttle spring 34 from contributing to the pedal force. Thereafter, further displacement of pivot 20 will have no effect on throttle position but will cause lever assembly 18 to break as described herein above.

It is to be understood that the invention has been described with reference to specific embodiments which provide the features and advantages previously described, and that such specific embodiments are susceptible of modification, as will be apparent to those skilled in the art. Accordingly, the foregoing is not to be construed in a limiting sense.

What is claimed is:

1. A mechanism adapted to be interposed between an engine throttle body and an operator accelerator pedal for varying engine speed independently of operator demand, said mechanism comprising:
    a first member adapted for slaved movement with said accelerator pedal between zero and full pedal travel positions;
    a second member adapted for slaved movement with said throttle body between idle and full throttle positions;
    motion transfer means including first and second lever portions mounted for limited relative rotation upon a pivot and interlinking said first and second members, said first member connected to said first lever portion at a first attachment point and said second member connected to said second lever portion at a second attachment point, said attachment points being spaced from one another and from said pivot;
    means operative to fix the relative positions of said lever portions whenever said throttle is in other than said idle position and to permit relative rotation of said lever portions when said throttle is in said idle position; and
    actuator means operative to selectively position said pivot to effect controlled displacement of said second member independent of displacement of said first member.

2. The mechanism of claim 1, further comprising means operative to continuously bias said throttle body towards said idle position at a fixed spring rate.

3. The mechanism of claim 1, further comprising means operative to continuously bias said accelerator pedal towards said zero pedal travel position.

4. A mechanism adapted to be interposed between an engine throttle body and an operator accelerator pedal for varying engine speed independently of operator demand, said mechanism comprising:
    a first member mounted for linear displacement along a first fixed line of action and adapted for slaved movement with said accelerator pedal between zero and full pedal travel positions;
    a second member mounted for linear displacement along a second fixed line of action generally parallel to said first line of action and adapted for slaved movement with said throttle body between idle and full throttle positions;
    a lever assembly including first and second elongate lever arms mounted for limited relative rotation upon a pivot and interlinking said first and second members, said first member connected to said first lever arm at a first attachment point and said second member connected to said second lever arm at a second attachment point, said attachment points being spaced from one another and from said pivot along said line of elongation;
    means operative to fix the relative positions of said lever arms whenever said throttle is in other than said idle position and to permit relative rotation of said lever arms when said throttle is in said idle position; and
    actuator means operative to selectively linearly displace said pivot between end limits of travel to effect controlled displacement of said second member along said second line of action independent of displacement of said first member along said first line of action.

5. The mechanism of claim 4, wherein said actuator means comprises means operative to drivingly engage said pivot for displacement along a fixed path of travel between said end limits.

6. The mechanism of claim 5, wherein said pivot driving engagement means is operative to selectively position said pivot between said end limits of travel in response to a control signal.

7. The mechanism of claim 6, further comprising control means operative to receive at least one parametric input signal and to generate said control signal as a function thereof.

8. The mechanism of claim 7, wherein one parametric input comprises a throttle body position feedback signal.

9. The mechanism of claim 7, wherein one parametric input comprises an accelerator pedal position feedback signal.

10. The mechanism of claim 6, further comprising means operative to disable operation of said control signal when said pivot reaches one of said end limits of travel.

11. The mechanism of claim 6, wherein said pivot driving engagement means comprises a threaded shaft carrying a pivot defining shuttle.

12. The mechanism of claim 11, wherein said actuator means further comprises a motor drivingly engaging said threaded shaft.

13. The mechanism of claim 12, wherein said motor is a dc motor and said control signal is a dc voltage signal, which is varied in response to a parametric input signal.

14. The mechanism of claim 11, wherein said threaded shaft is mounted for rotation about an axis generally parallel to said first and second lines of action.

15. The mechanism of claim 4, further comprising at least one end limit switch disposed to sense when said pivot reaches at least one of said end limits of travel.

16. The mechanism of claim 4, further comprising swivels interconnecting said first and second members with said lever at said respective attachment points.

17. The mechanism of claim 4, further comprising means operative to continuously bias said throttle body towards said idle position at a fixed spring rate.

18. The mechanism of claim 17, further comprising means operative to continuously bias said accelerator pedal towards said zero pedal travel position.

19. A vehicle traction control system comprising:
an engine throttle body displaceable between idle and full throttle positions;
an operator accelerator pedal displaceable between zero and full pedal travel positions;
a control circuit operative to receive at least one parametric input signal indicative of a vehicle wheel slip condition and to generate a control signal as a function thereof;
a first member mounted for displacement along a first line of action and affixed for slaved movement with said accelerator pedal;
a second member mounted for displacement along a second line of action generally parallel to said first line of action and affixed for slaved movement with said throttle body; and
a mechanism operative to vary engine speed independently of operator demand comprising first and second oppositely directed elongated rigid levers mounted for limited rotation upon a pivot and interlinking said first and second members, said first member connected to said first lever at a first attachment point spaced from said pivot in one direction along said first lever line of elongation, said second member connected to said second lever at a second attachment point spaced from said pivot in an opposite direction along said second lever line of elongation, motorized actuator means operative to drivingly engage said pivot for controlled displacement along a fixed path between end limits of travel in response to said control signal to effect controlled displacement of said second member along said second line of action independent of operator induced displacement of said first member along said first line of action, means operative to align and fix said first and second lever lines of elongation whenever said throttle is in other than said idle position and permit relative rotation of said levers when said throttle is in said idle position, and means operative to sense whenever said pivot has reached either of said end limits of travel and to modify generation of said control signal in response thereto to effect unidirectional positioning of said pivot toward the other of said end limits of travel.

20. A mechanism adapted to be interposed between an engine throttle body and an operator accelerator pedal for varying engine speed independently of operator demand, said mechanism comprising:
a first member adapted for slaved movement with said accelerator pedal between first and second pedal travel positions;
a second member adapted for slaved movement with said throttle body between first and second throttle positions;
motion transfer means including first and second lever portions mounted for limited relative rotation upon a pivot and interlinking said first and second members, said first member connected to said first lever portion at a first attachment point and said second member connected to said second lever portion at a second attachment point, said attachment points being spaced from one another and from said pivot;
means operative to fix the relative positions of said lever portions whenever said throttle is in other than said first position and to permit relative rotation of said lever portions when said throttle is in said first position; and
actuator means operative to selectively position said pivot to effect controlled displacement of said second member independent of displacement of said first member.

21. The mechanism of claim 1, further comprising means operative to continuously bias said accelerator pedal with increasing force during cable intervention.

22. The mechanism of claim 18, further comprising means operative to continuously bias said accelerator pedal with increasing force during cable intervention.

* * * * *